(12) United States Patent
Ohta (10) Patent No.: US 7,697,041 B2
(45) Date of Patent: Apr. 13, 2010

(54) ZOOM LENS SYSTEM AND CAMERA USING THE SAME

(75) Inventor: Seiya Ohta, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1175 days.

(21) Appl. No.: 11/196,867

(22) Filed: Aug. 3, 2005

(65) Prior Publication Data

US 2006/0044456 A1 Mar. 2, 2006

(30) Foreign Application Priority Data

Aug. 25, 2004 (JP) ............................. 2004-245204

(51) Int. Cl.
*H04N 5/262* (2006.01)
(52) U.S. Cl. .............................. 348/240.3; 348/240.99; 348/211.6; 348/211.9; 348/340; 348/335
(58) Field of Classification Search ................. 348/335, 348/340, 345, 240.3, 240.99, 211.6, 211.9; 396/76, 86, 72, 79, 103
See application file for complete search history.

(56) References Cited

U.S. PATENT DOCUMENTS

| 4,804,831 A | 2/1989 | Baba | |
| 5,055,665 A | 10/1991 | Baba | |
| 6,633,729 B1* | 10/2003 | Yoshikawa et al. | ............ 396/76 |
| 7,079,182 B1* | 7/2006 | Yoshikawa et al. | ....... 348/240.3 |
| 2002/0171751 A1* | 11/2002 | Ohkawara | ................ 348/347 |
| 2003/0030920 A1* | 2/2003 | Okawara | ................ 359/823 |
| 2004/0061949 A1 | 4/2004 | Yakita | |
| 2005/0254808 A1* | 11/2005 | Okawara | ................ 396/79 |
| 2006/0023091 A1* | 2/2006 | Uchiyama | ............... 348/240.1 |

FOREIGN PATENT DOCUMENTS

| EP | 1403673 A2 | 3/2004 |
| EP | 1403673 A2 * | 3/2004 |
| JP | 62-103616 A | 5/1987 |
| JP | 2003-262780 A | 9/2003 |

\* cited by examiner

*Primary Examiner*—Yogesh K Aggarwal
(74) *Attorney, Agent, or Firm*—Canon U.S.A., Inc. I.P. Division (57) ABSTRACT

At least one exemplary embodiment is directed to a rear zoom lens system which includes focus preset devices 15 and 16 for controlling the storage of a given distance from a subject (camera-to-subject distance) and shift of focus to the position. Trajectory information can be stored corresponding to each of camera-to-subject distances and indicating correspondences between zoom-and-focus positions, which facilitates moving the second lens group to compensate for the movement of the first moving lens group while facilitating maintaining its focus.

2 Claims, 9 Drawing Sheets

FOCAL LENGTH
(POSITION OF VARYING-MAGNIFICATION LENS)

ZOOM LENS SYSTEM AND CAMERA USING THE SAME

BACKGROUND OF THE INVENTION

1. Field of the Invention

The present invention relates to a camera and/or camera zoom lens system, and more particularly, though not exclusively, to a camera zoom lens and/or camera having a function for presetting focus to any distance.

2. Description of the Related Art

Figure 8:
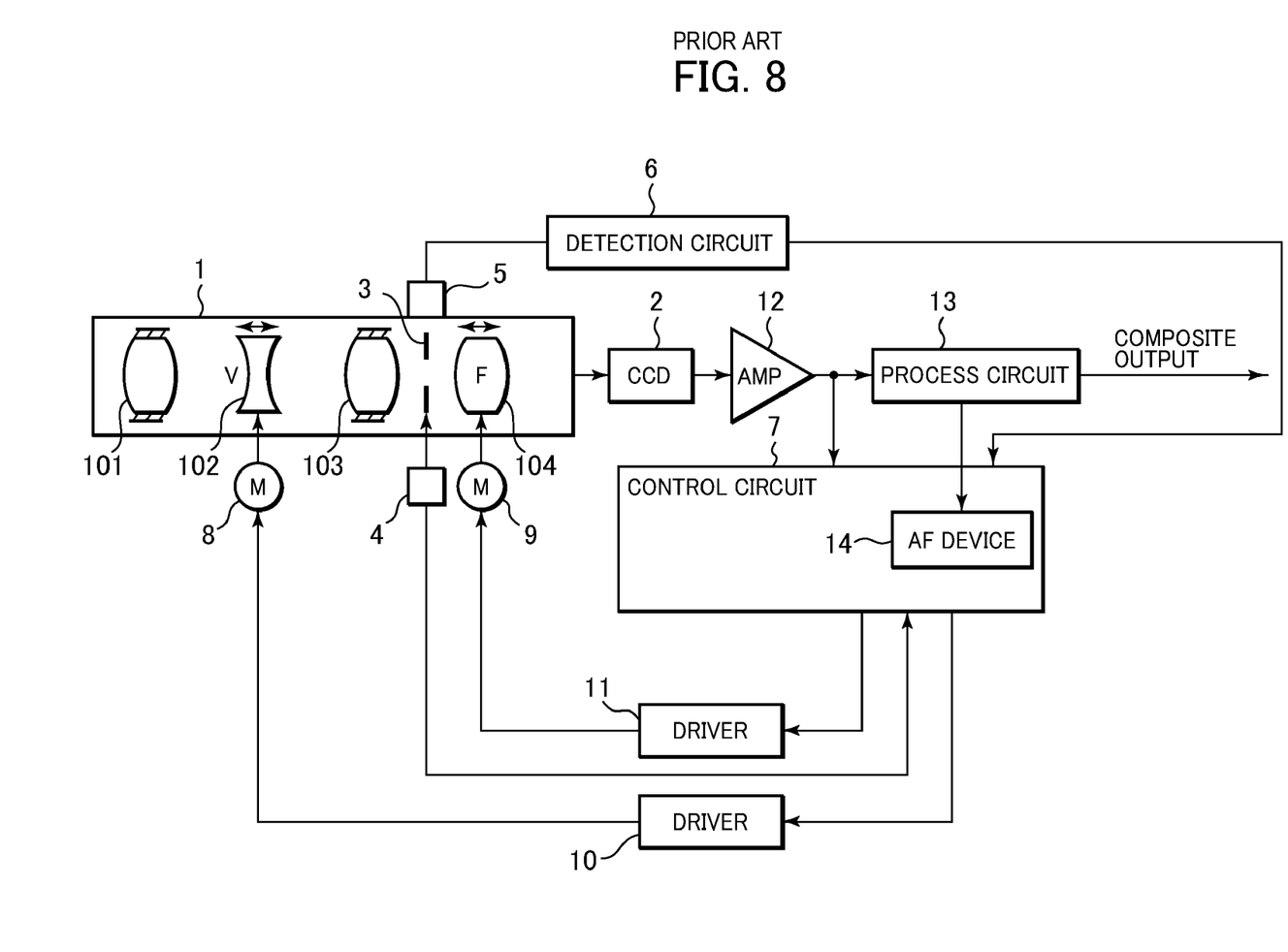
FIG. 8 illustrates a block diagram of a conventional digital camera with a zoom lens.

In recent years, cameras with autofocus and zoom lens have become widespread. FIG. 8 illustrates a block diagram of a conventional example of a digital camera with a zoom lens.

An optical system 1 is made up of a four-group rear focus zoom lens (hereinafter called "RFZ lens") construction consisting of four lens groups. The RFZ lens 1 consists of a first lens group (hereinafter called "front lens") 101 as a fixed lens group, a second lens group (hereinafter called "zooming lens") 102 as a moving lens group having a magnification varying function, a third lens group (hereinafter called "afocal lens") 103 as another fixed lens group, and a fourth lens group (hereinafter called "focus lens") 104 as another moving lens group having both a focusing function and a compensator function for reducing a shift in the position of an imaging surface due to a change in magnification.

Although each lens group actually consists of one or more lenses, the number of elements in each lens group is not particularly limited.

Reference numeral 2 designates a photoelectric conversion device such as a CCD, reference numeral 3 designates an aperture mechanism for regulating the amount of light incident on the photoelectric conversion device 2, and reference numeral 4 designates aperture driving device through which the aperture mechanism 3 is controlled by a control circuit 7 to maintain a constant amount of light incident on the photoelectric conversion device 2. Reference numeral 5 designates an aperture and lens position detecting device, and reference numeral 6 designates a detection circuit for detecting the output of the aperture and lens position detecting device 5 and outputting it to the control circuit 7.

Reference numerals 8 and 9 designate lens driving devices, such as step motors, for driving the moving lens groups 102 and 104, respectively, and reference numerals 10 and 11 designate motor drivers for driving the lens driving devices 8 and 9, respectively. The control circuit 7 controls the lens driving devices 8 and 9 to drive the lens groups 102 and 104 based on their position detection signals from the aperture and lens position detecting device 5.

Reference numeral 12 designates an amplifier for amplifying the output of the photoelectric conversion device 2, reference numeral 13 designates a process circuit for converting the output signal to a signal such as an NTSC picture signal while generating an AF signal for automatic focus (AF), and reference numeral 14 designates an AF device for performing an AF operation according to the AF signal from the process circuit. Although a hill-climbing method is proposed as an AF method, since it is known in the art, its detailed description will be omitted (see, for example, Japanese Patent Application Laid-Open No. 62-103616 (1987)).

Figure 3:
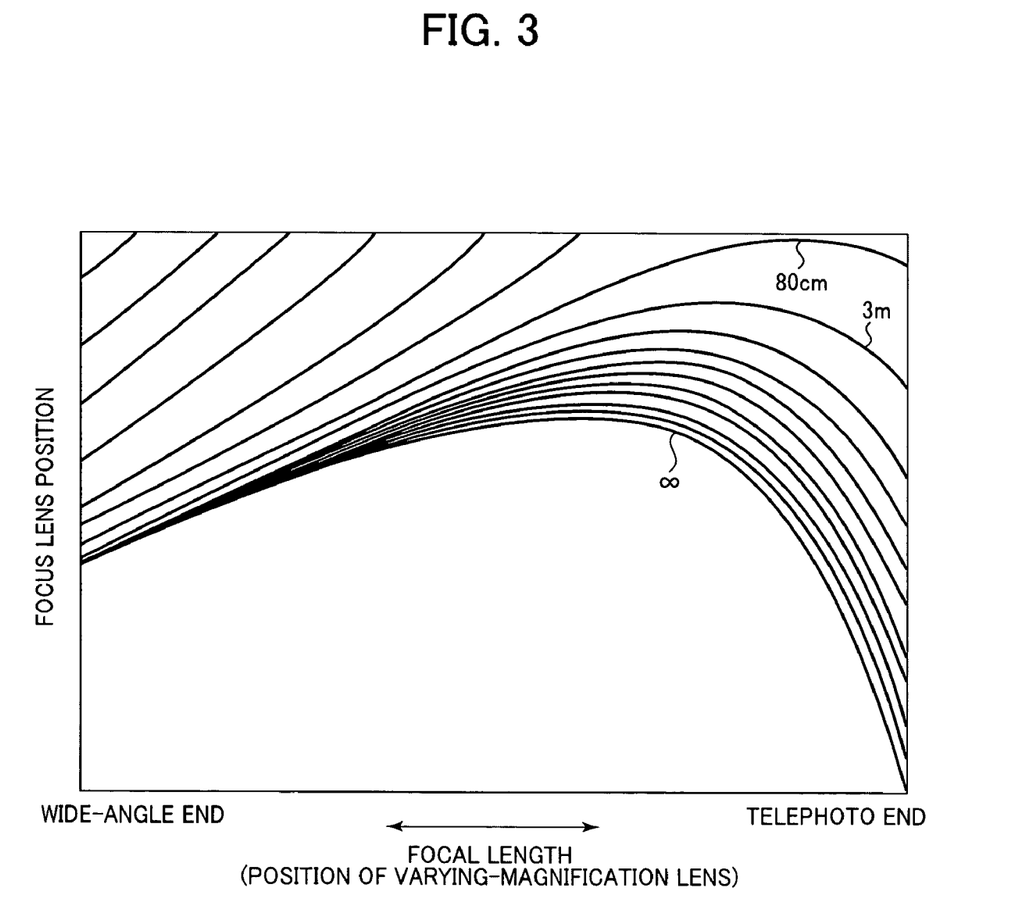
FIG. 3 illustrates a graph showing the trajectory of the focus position of a focus lens at each focal length.

FIG. 3 illustrates a graph showing information on the position of the focus lens 104 relative to the position of the zooming lens 102 illustrated in FIG. 8. For example, suppose that zooming is done in such a condition that a subject located at a distant (e.g., at infinity) position is in focus. In this case, in order to maintain focus on the subject at all times during zooming, it is necessary to move the focus lens 104 according to the position of the zooming lens 102 in such a manner that the focus lens 104 will move to follow the track of cam movement, or cam trajectory (e.g., the infinity curve (8) illustrated in FIG. 3).

In a rear focus zoom lens system, cam trajectory information as shown in FIG. 3 is prestored in a storage device, so that during zooming the position of the focus lens relative to the zooming lens is determined from the cam trajectory information and controlled to maintain its focus.

Figure 9:
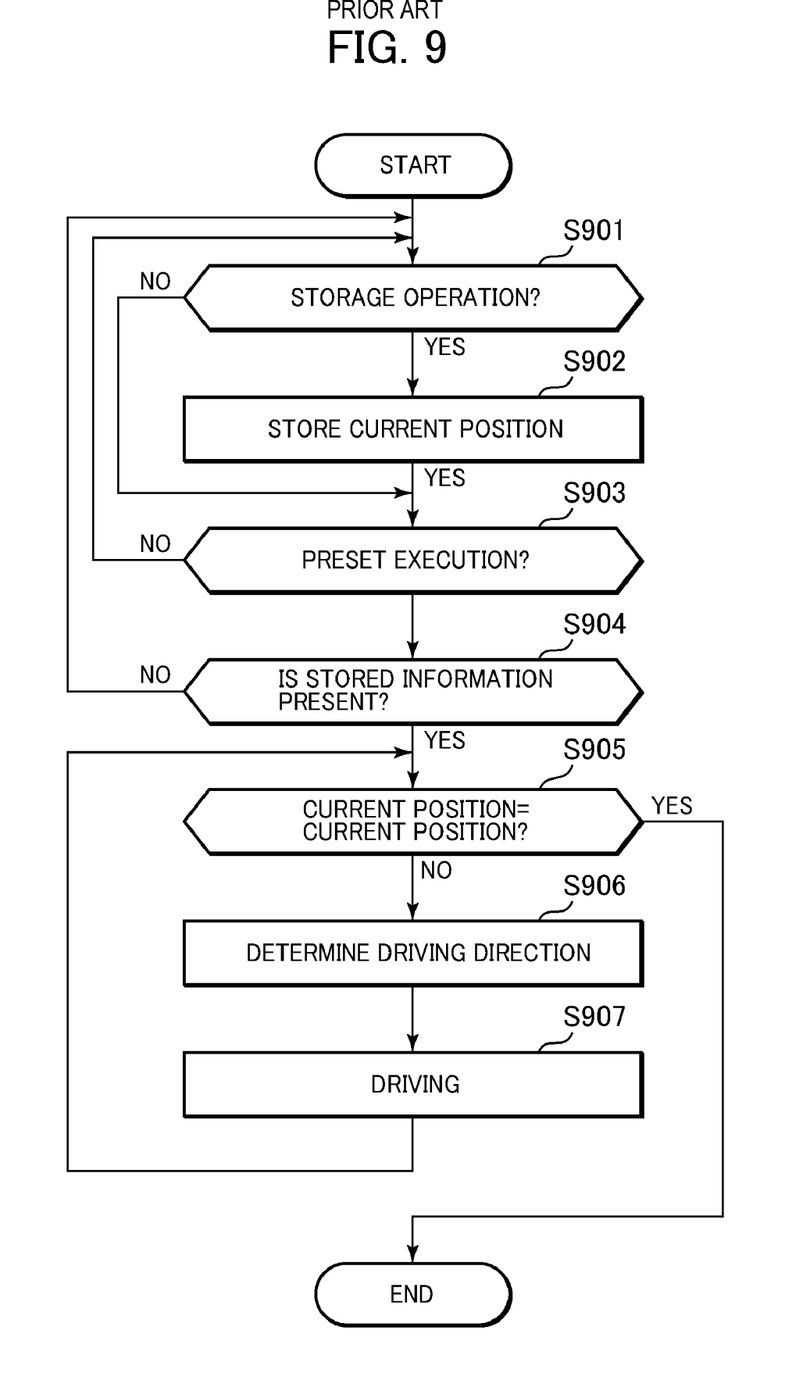
FIG. 9 illustrates a flowchart of a conventional focus preset function.

FIG. 9 illustrates a flowchart showing the flow of a focus preset function of a zoom lens of a front focus type. When a storage operation is performed, the focus position at the time when the operation is done is stored, while when an execution operation is performed, the focus position is compared with the stored position to drive the focus lens to the stored position. At first, it is determined whether a storage operation is present (S901). If present, the current focus position is stored (S902) and the procedure goes to the next step. If not present, the procedure goes to step S903 to determine whether an execution operation is present. If the execution operation is present, it is determined whether stored information (stored position) is present (S904). If present, the current focus position is compared with the stored position (S905). If the current position does not match the stored position, the direction of driving the focus lens is determined (S906) to drive it (S907) in the direction, and the procedure returns to step S905. These operations are repeated until the current position matches the stored position. If there is no stored position in step S904, the procedure returns to step S901. The stored, focus-preset position is not changed even when the position of the zooming lens changes.

Recently, in order to expand the possibilities of photography, there has been a strong demand for image-taking apparatuses such as cameras having a focus preset function for shifting focus to a predetermined stored position in a given manner. The demand for compact size and excellent AF performance has also been increasing. For these reasons, the rear focus lens design is becoming popular for optical apparatuses.

However, in the conventional rear focus lens, the position of the focus lens, needed to maintain its focus, varies according to the zoom position. Therefore, when performing zooming, the system has to do more than just store the focus position, or it will result in a deviation from the stored position of distance from a subject (camera-to-subject distance).

In other words, in such a rear focus lens construction, the stored, focus-preset data is almost equal to nothing. Even if such data is stored, it can be subject to some constraints (e.g., canceling the stored data whenever a zooming operation is performed). Thus, conventional systems do not use focus preset functions in a rear focus lens configuration.

SUMMARY OF THE INVENTION

At least one exemplary embodiment is related to a zoom lens system that can maintain the stored, focus-preset position of a subject throughout a substantial portion of the zoom range in a rear focus zoom lens construction, and a camera using the zoom lens system. In additional exemplary embodiments, when a focus preset is performed in a rear focus type zoom lens system, information storage is carried out based on trajectory identification information, which can identify plural trajectories.

At least one exemplary embodiment can maintain a stored, focus-preset camera-to-subject distance throughout a substantial portion of the zoom range.

According to at least one exemplary embodiment, the focus preset function can be incorporated in a rear focus zoom construction.

Further features of the present invention will become apparent from the following description of exemplary embodiments (with reference to the attached drawings).

DESCRIPTION OF THE EMBODIMENTS

The following description of exemplary embodiment(s) is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes). Additionally exemplary embodiments are not limited to visual optical photographic systems, for example the system can be designed for use with infrared and other wavelength imaging systems. Additionally, exemplary embodiments can be used with non-digital image capturing systems as well as digital image capturing systems (e.g., photographic systems using CCDs).

Notice that similar reference numerals and letters refer to similar items in the following figures, and thus once an item is defined in one figure, it may not be discussed for following figures.

At least one exemplary embodiment will now be described with reference to the accompanying drawings.

Figure 1:
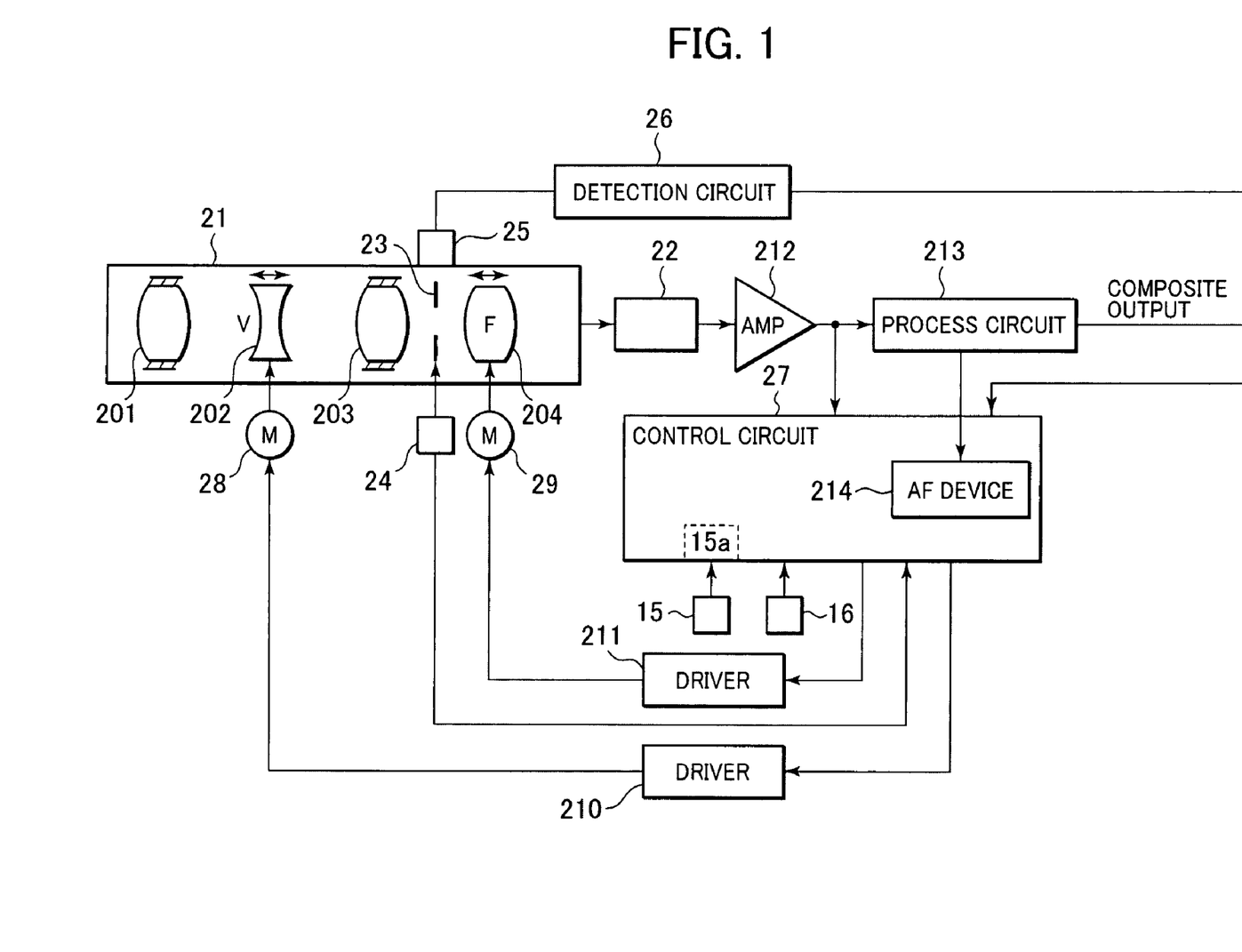
FIG. 1 illustrates a block diagram showing the structure of at least one exemplary embodiment.

FIG. 1 illustrates a block diagram showing the structure of an exemplary embodiment. An optical system 21 can be made up of a focus zoom lens (e.g., a rear focus zoom lens) with a plurality of groups (e.g., four-group). In the current, non-limiting, example (FIG. 1) the RFZ lens construction consists of four lens groups forming a rear focus zoom lens (RFZ lens). The RFZ lens 21 includes a first front-lens group 201 (e.g., as a fixed lens group), a second zooming-lens group 202 (e.g., as a moving lens group) having a varying magnification function, a third afocal-lens group 203 (e.g., as another fixed lens group), and a fourth focus-lens group 204 (e.g., as another moving lens group), which can have both a focusing function and a compensator function for reducing a shift in the position of an imaging surface due to a change in magnification.

Although each lens group actually consists of one or more lenses, the number of elements in each lens group is not limited in any exemplary embodiments. Additionally although the first front lens group and the third afocal lens group are described as fixed lens groups in the example, additional exemplary embodiments can have these lens groups moving. Additionally the third lens group is described as an afocal lens group, in other exemplary embodiments the third lens group is not an afocal lens group.

Reference numeral 22 designates a photoelectric conversion device (e.g., a charge-coupled image sensor (CCD) or a solid-state image sensor), reference numeral 23 designates an aperture mechanism for regulating the amount of light incident on the photoelectric conversion device 22, and reference numeral 24 designates an aperture driving device through which the aperture mechanism 23 is controlled by a control circuit 27 to maintain a substantially constant amount of light incident on the photoelectric conversion device 22. Reference numeral 25 designates an aperture and lens position detecting device, and reference numeral 26 designates a detection circuit for detecting the output of the aperture and lens position detecting device 25 and outputting it to the control circuit 27.

Reference numerals 28 and 29 designate lens driving devices (e.g., step motors), for driving the moving lens groups 202 and 204, respectively, and reference numerals 210 and 211 designate drivers for driving the lens driving devices 28 and 29, respectively. The control circuit 27 controls the lens driving devices 28 and 29 to drive the lens groups 202 and 204 based on their position detection signals from the aperture and lens position detecting device 25.

Reference numeral 212 designates an amplifier for amplifying the output of the photoelectric conversion device 22, reference numeral 213 designates a process circuit for converting the output signal to a signal (e.g., a NTSC picture signal) while generating an AF signal for automatic focus (AF), and reference numeral 214 designates an AF device for performing an AF operation according to the AF signal from the process circuit 213.

Reference numeral 15 designates a preset storage switch and reference numeral 16 designates a preset execution switch. These switches are used to perform focus-preset storage and execution operations, respectively. A focus position at a distance from a subject measured when the preset storage switch 15 is operated is stored in a storage device 15a (e.g., RAM memory, detachable memory card, other data storage devices as known by one of ordinary skill in the relevant art, and equivalents) as a stored focus position. The storage device 15a can be part of the control circuit 27, or separate and in communication with the control circuit 27. Then, with the operation of the preset execution switch 16, the current focus position is compared with the stored focus position (e.g., stored in storage device 15a), and if they do not match within a predetermine variance, a preset function is performed so that the focus position is shifted to the stored focus position. Note that although two separate switches 15 and 16 are discussed herein, exemplary embodiments are not limited to any number of switches, for example one switch could contain both functions, where the switch is a button that can be pushed and turned. Likewise a single switch in different flipped positions (e.g., left and right), where the different flipped positions are associated with the preset storage operation and the preset execution operation.

Figure 2:
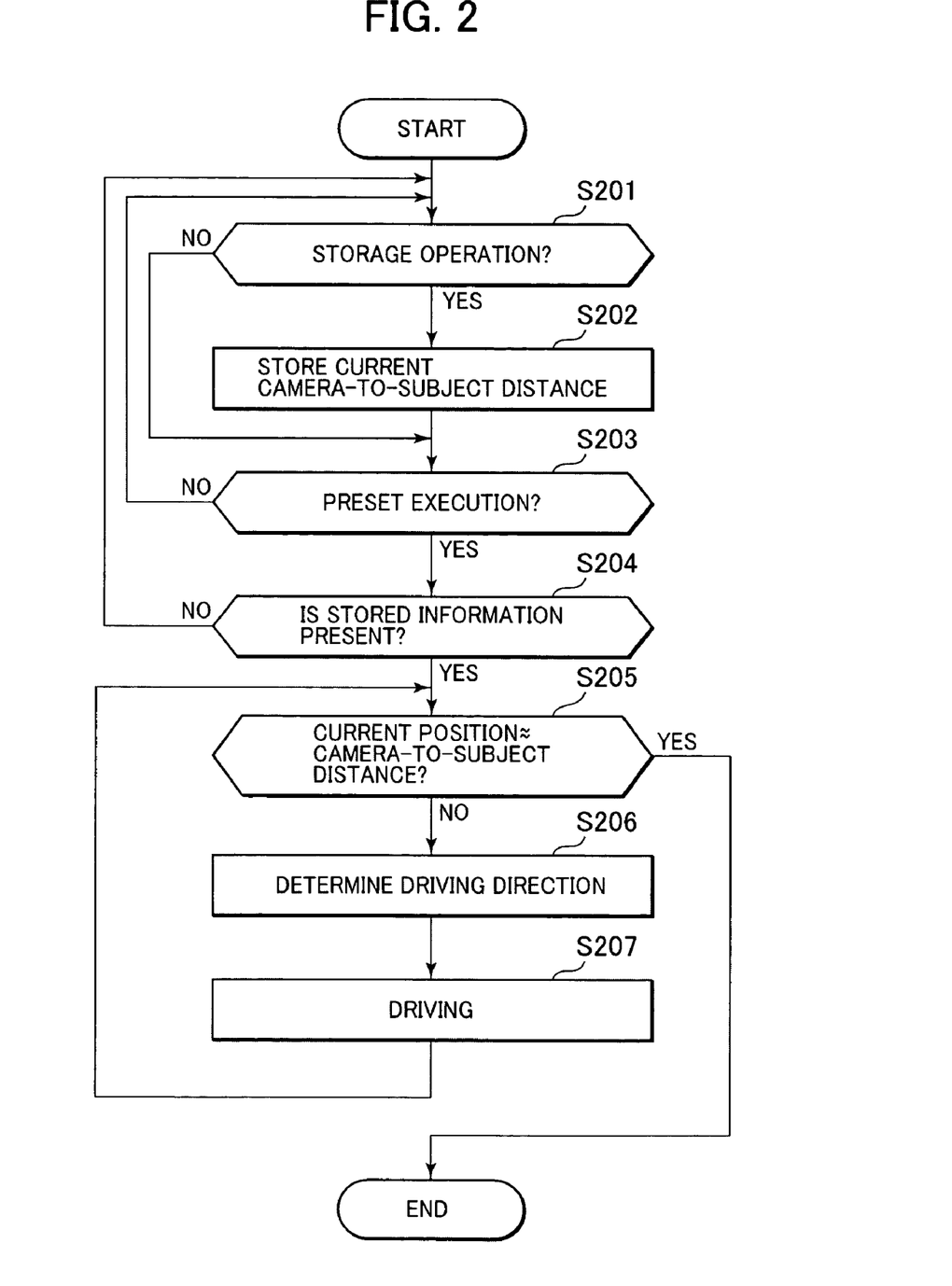
FIG. 2 illustrates a flowchart schematically showing storage and execution operations of at least one preset function in accordance with at least one exemplary embodiment.

FIG. 2 illustrates a flowchart schematically showing the storage and execution operations of the preset function. At first, it is detected whether the storage operation device (preset storage switch) 15 is operated (S201). If detected, the current distance from a subject (camera-to-subject distance) is stored in the storage device 15a (e.g., in the control circuit (S202)). Then, it is determined whether the execution operation device (preset execution switch) 16 is operated (S203). If it is not operated, the procedure returns to step S201. On the other hand, if it is operated, then it is determined whether stored information is present (S204). If present, the current focus position is compared to determine whether it substantially (i.e. within a predetermined variance) matches the camera-to-subject distance (S205) (i.e. the stored focus position). If they do not substantially match, the driving direction of the focus lens is determined (S206) to drive it in the direction (S207). Then, the procedure returns to step S205 to repeat these operations until the current focus position matches substantially (i.e. within a predetermined variance) the camera-to-subject distance. On the other hand, if it is determined in step S204 that there is no stored focus position, the procedure returns to step S201.

When the magnification is varied in the focus type lens system shown in FIG. 1, the focus position of the focus lens 204 relative to the camera-to-subject distance at each focal length is as shown in FIG. 3. In other words, in order to vary the magnification while maintaining focus, one can store trajectory information in any form (which may be the trajectory itself or in the form of a function, which can use the lens position as a variable), read the trajectory information according to the position of the zooming lens 102, and move the focus lens 204 based on the information.

Figure 4:
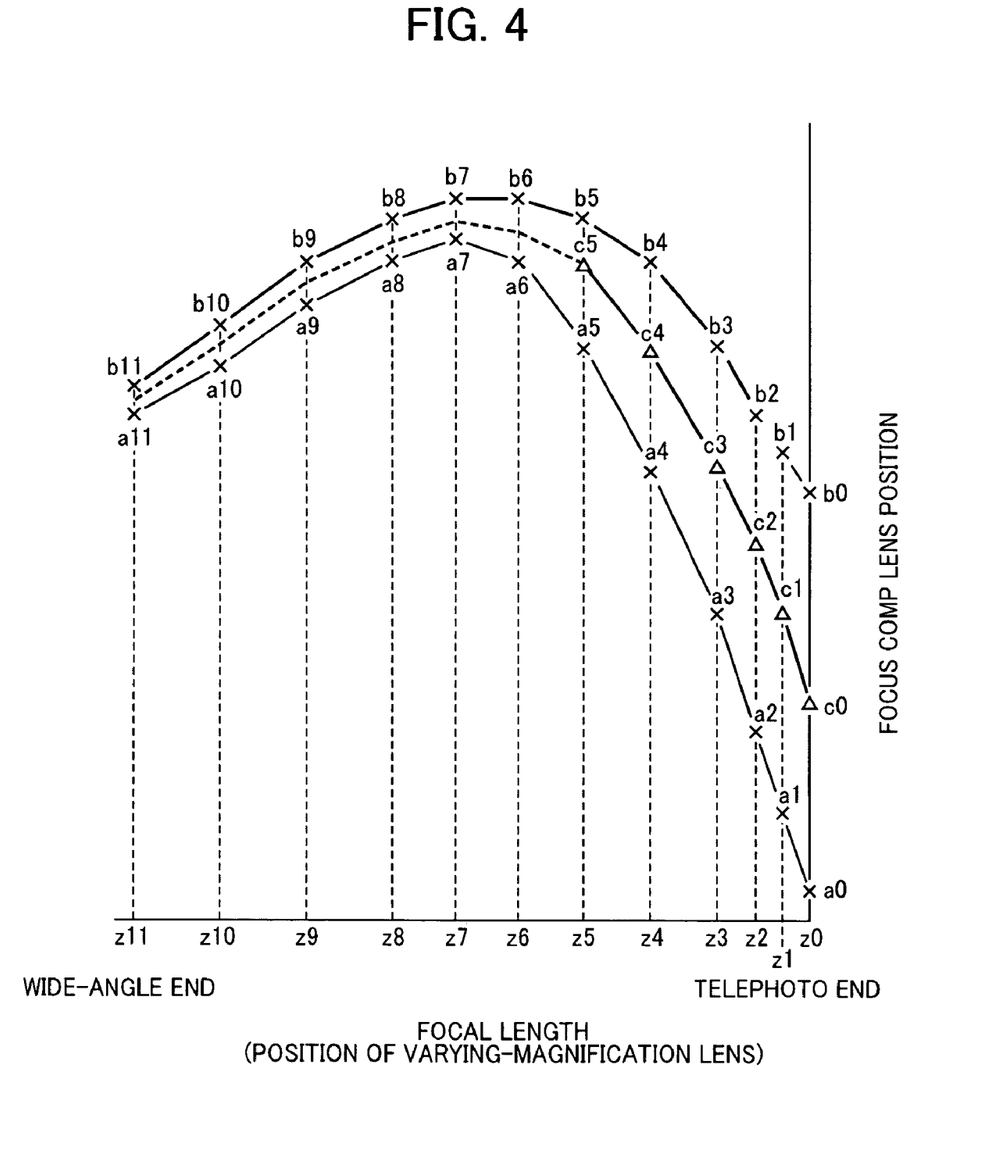
FIG. 4 illustrates a graph for explaining an example of trajectory tracking according to at least one exemplary embodiment.

FIG. 4 is a graph for explaining an example of a trajectory tracking operation according to at least one exemplary embodiment. In FIG. 4, curves plotted with points a0, a1, a2-a11, and points b0, b1, b2-b11 are typical trajectories that can be stored in the control circuit 27. Further, a curve plotted with points c0, c1, c2-c11 can be a trajectory calculated based on the above-mentioned two typical trajectories according to the following equation (1):

$$c(n+1)=[\{|c(n)-a(n)|/|b(n)-a(n)|\}\times\{|b(n+1)-a(n+1)|\}]+a(n+1) \quad (1)$$

According to equation (1), when the focus lens 204 is, for example, at point c0 in FIG. 4, an internal division ratio of c0 dividing the line segment b0–a0 is determined to determine, according to the ratio, point c1 that internally divides the line segment b1–a1. For example, the following equation (2) can be used to calculate the internal division ratio:

$$c1=a1+(b1-a1)\times(\alpha/\beta) \quad (2)$$

where α is the numerator of the internal division ratio, that is, α=c0−a0, and β is the denominator of the internal division ratio, that is, β=b0−a0. Thus, c1 corresponds to the position of the focus lens when zooming is done while maintaining focus at the position of the distance c0.

Figure 5:
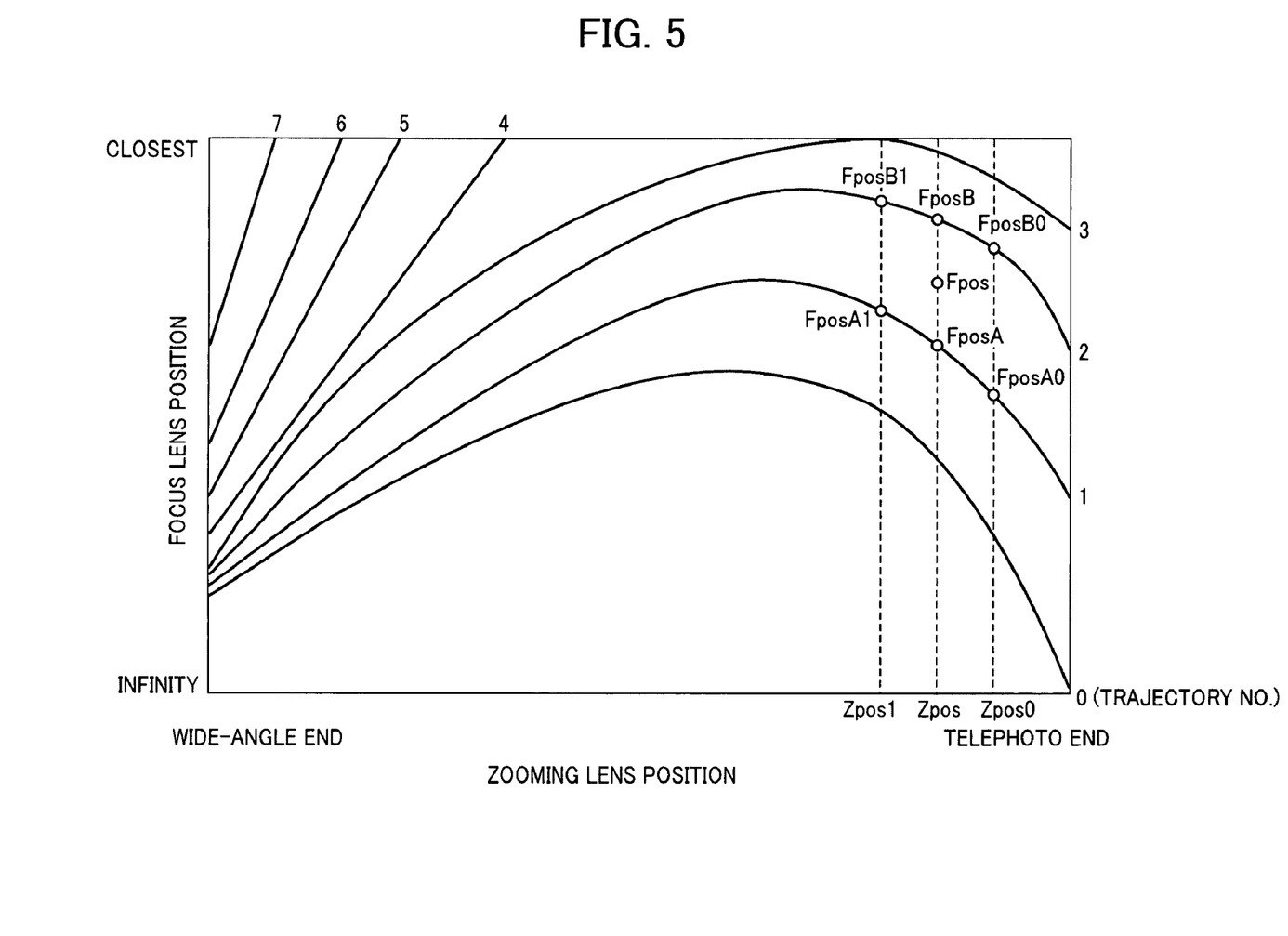
FIG. 5 illustrates a graph showing an example of eight stored trajectories.

FIG. 5 illustrates an example of eight stored trajectories for different camera-to-subject distances (trajectory Nos. 0 to 7 in FIG. 5). The current focus position is represented as Fpos and the zoom position is represented as Zpos. When a focus-preset storage operation is performed on this position, the trajectory used for compensation and the above-mentioned internal division ratio, are stored (e.g., in the storage device 15a) as information on the focus preset position at each camera-to-subject distance.

The following shows an example. If the current zoom position is on a zoom position having the above-mentioned, stored trajectory data, the internal division ratio can be determined from the above-mentioned equations. However, it is assumed in this non-limiting example that the zoom position Zpos is between zoom positions Zpos0 and Zpos1, both having respective trajectory data, rather than exactly on the current zoom position Zpos.

The internal division ratio at the current zoom position is calculated as mentioned below. In this calculation, the far-range side trajectory position FposA at the current zoom position and close-range side trajectory position FposB at the current zoom position are determined approximately. Here, a calculation example using a linear approximation method is shown. Note that numeric values are large on the telephoto side and small on the wide-angle side of the zoom range. Note also that numeric values for focus parameters are large on the close-range side and small on the infinity side.

Note further that symbols in equations to be mentioned below denote the following variables:

Zpos: Current zoom position
Fpos: Current focus position
FposA: Far-range side trajectory position at current zoom position
FposB: Close-range side trajectory position at current zoom position
Zpos0: Telephoto side zoom position with stored trajectory data
Zpos1: Wide-angle side zoom position with stored trajectory data
FposA0: Far-range side trajectory position at Zpos0
FposA1: Far-range side trajectory position at Zpos1
FposB0: Close-range side trajectory position at Zpos0
FposB1: Close-range side trajectory position at Zpos1
α: Numerator of internal division ratio
β: Denominator of interior division ratio Using the above variables, the following equations are given:

$$FposA=FposA1-(FposA1-FposA0)\times(Zpos-Zpos1)/(Zpos0-Zpos1) \quad (3)$$

$$FposB=FposB0+(FposB1-FposB0)\times(Zpos-Zpos0)/(Zpos0-Zpos1) \quad (4)$$

$$\alpha=Fpos-FposA \quad (5)$$

$$\beta=FposB-FposA \quad (6)$$

The trajectory Nos. used in this calculation correspond to Nos. of selected trajectories determined from the current focus and zoom positions. In the above example, Nos. 1 and 2 are used. In this case, not only the internal division ratio but also information for identifying the stored trajectories to be selected and used for the calculation can be stored data. In the above example, since Nos. 1 and 2 are used, the information to be stored is such information that can t indicate the use of Nos. 1 and 2. For example, the stored data may indicate "Nos. 1 and 2." Alternatively, "No. 1" may be stored on the precondition that the setting of the use of "No. 1" and "No. 2" can be identified upon calculation. Thus, the trajectory data to be stored is not subject to any particular constraint. For example, trajectory data in accordance with at least one exemplary embodiment can be stored so that the trajectory Nos. used can be identified.

The following is an example of a set of stored data in accordance with at least one exemplary embodiment:

TrackData=1
α=100
β=300

These pieces of data are stored in memory (e.g., the storage device 15a) when the preset storage operation is done.

Figure 6:
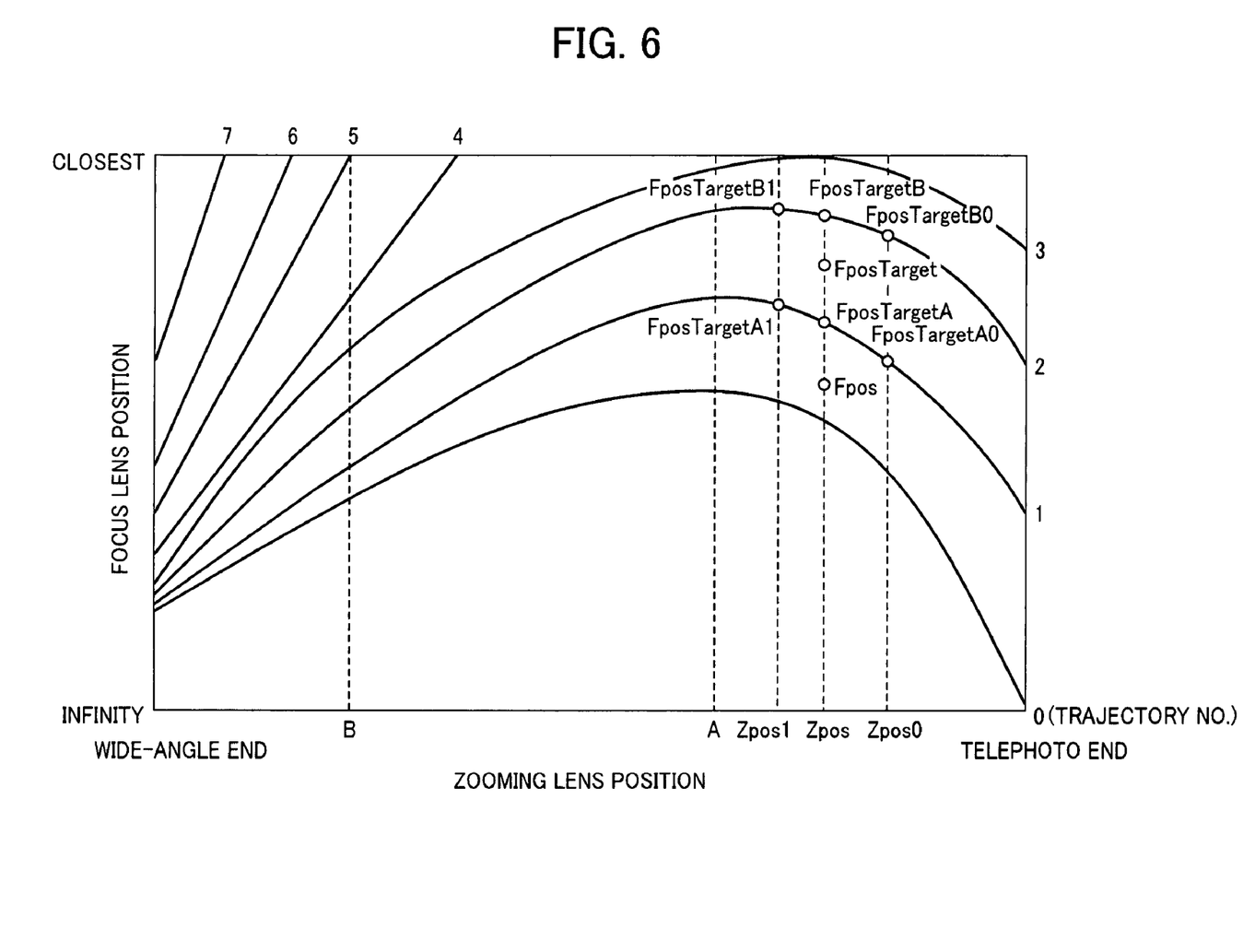
FIG. 6 illustrates a graph showing an example in which a preset execution operation is performed when zoom and focus positions are changed after preset storage.

FIG. 6 illustrates an example in which a preset execution operation is performed in a situation where the zoom and focus positions stored at the time of the storage operation have been changed after the preset storage. In this case, the preset focus position is determined from the current zoom position, and data pieces stored in the focus-preset storage operation, that is, trajectory No. (TrackData), the numerator α of internal division ratio, and the denominator β of internal division ratio, according to equations to be mentioned below.

Note that symbols in the equations denote the following variables:

Zpos: Current zoom position
FposTarget: Preset focus position
FposTargetA: Far-range side trajectory position at current zoom position obtained from stored trajectory No.
FposTargetB: Close-range side trajectory position at current zoom position obtained from trajectory No.
Zpos0: Telephoto side zoom position with stored trajectory data
Zpos1: Wide-angle side zoom position with stored trajectory data
FposTargetA0: Stored trajectory position obtained from far-range side trajectory No. at Zpos0
FposTargetA1: Stored trajectory position obtained from far-range side trajectory No. at Zpos1
FposTargetB0: Stored trajectory position obtained from close-range side trajectory No. at Zpos0
FposTargetB1: Stored trajectory position obtained from close-range side trajectory No. at Zpos1
α: Numerator of internal division ratio
β: Denominator of interior division ratio Using the above variables, the following equations are given:

$$FposTargetA = FposTargetA0 + (FposTargetA1 - FposTargetA0) \times (Zpos - Zpos0)/(Zpos0 - Zpos1) \quad (7)$$

$$FposTargetB = FposTargetB0 + (FposTargetB1 - FposTargetB0) \times (Zpos - Zpos0)/(Zpos0 - Zpos1) \quad (8)$$

$$FposTarget = FposTargetB + (FposTargetA - FposTargetB) \times (\alpha/\beta) \quad (9)$$

Upon preset execution, the focus lens can be driven from the current focus position to the FposTarget position. Thus, the camera-to-subject distance stored at the time when the storage operation is done can be reproduced even when the zoom position is changed.

Figure 7:
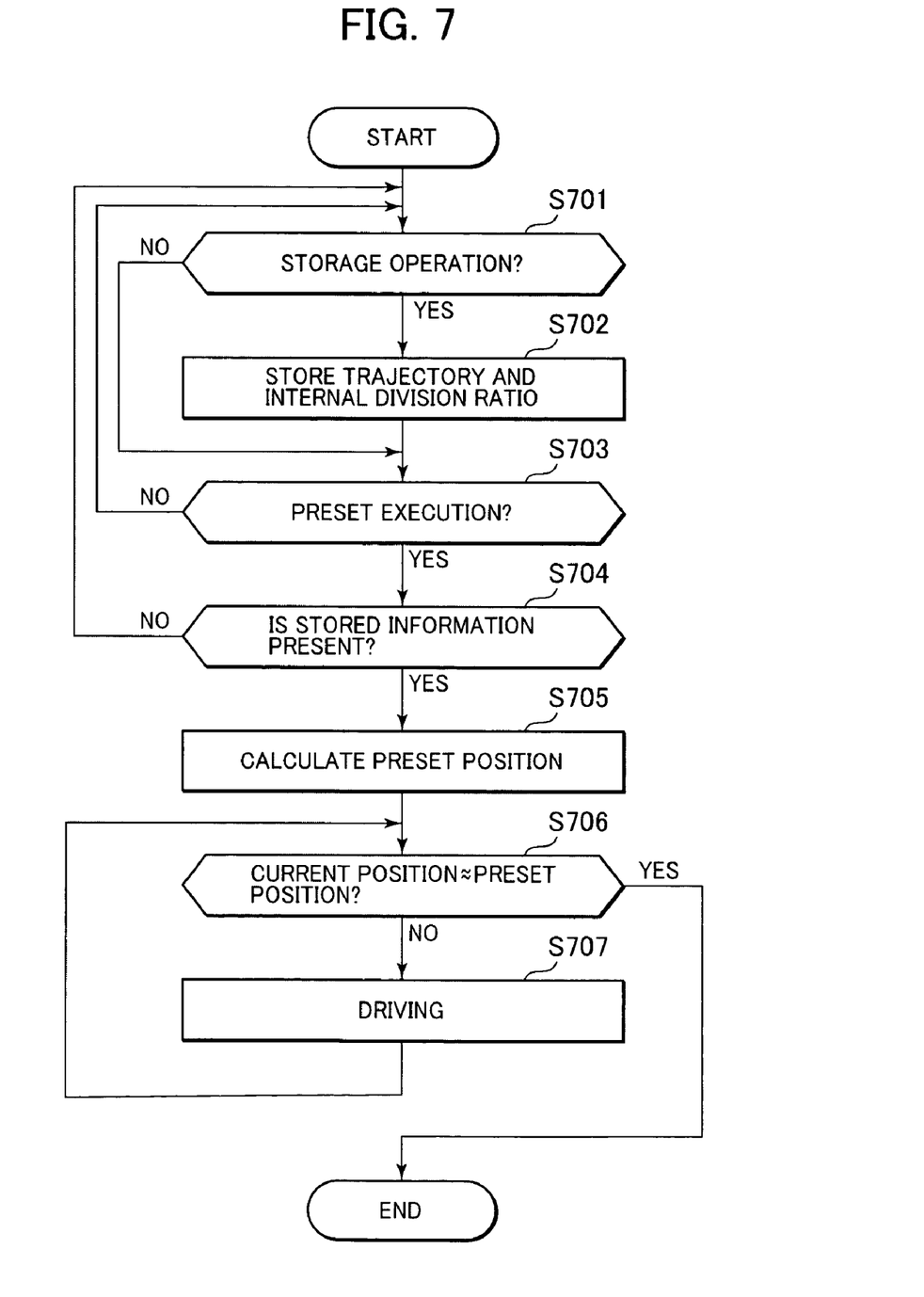
FIG. 7 illustrates a flowchart of preset execution.

FIG. 7 illustrates a focus preset function in accordance with at least one exemplary embodiment. At first, it is determined whether a focus-preset storage operation is present (S701). If present, the trajectory No. and the internal division ratio determined from the current focus and zoom positions are stored (S702) (e.g., in the storage device 15a) and the procedure goes to the next step. If not present (if NO in step S701), the procedure goes to step S703. Then, it is determined whether a preset execution operation is present (S703). If present, it is determined whether stored information is present (S704). If present, a preset position is calculated from the zoom position and the stored information (S705) to compare whether the current focus position matches the preset position (S706) within a predetermined variance (e.g., within 0.1% of each other)

If they do not match within a predetermined variance, the focus lens is driven (S707) and the procedure returns to step S706 to repeatedly drive the focus lens until it matches the preset position within a predetermined variance. On the other hand, if it is determined in step S704 that there is no stored position, the procedure returns to step S701.

As discussed above, the focus preset position can be changed according to a change in zoom position. However, since the selected trajectory No. (Nos.) and the internal division ratio are prestored as preset information for maintaining the position of the camera-to-subject distance, the focus preset function can be effectively used throughout a substantial portion of zoom range even in the rear focus lens construction.

It is also found that the trajectories of the rear focus lens tend to converge on the wide-angle side and disperse on the telephoto side. This tendency can cause the following problem.

Suppose that the focus-preset storage operation is performed at zoom position A as shown in FIG. 6, and the zoom lens is driven to position B in the wide-angle direction in a manual focus mode without focus adjustment. Suppose further that the focus-preset storage operation is performed again at the position B. In this case, if the preset execution operation is performed after the zoom lens is moved back to zoom position A, it will cause a displacement from the stored position.

This is because the resolution of the camera-to-subject distance at the wide-angle side zoom position B is rougher than that at the zoom position A. For example, suppose that the values, α and β, for the internal division ratio are 115 and 300 at the zoom position A (e.g., at a position corresponding to FposTargetA). In this case, if the preset storage is performed again at the wide-angle side zoom position B, they will become 1 and 3. Therefore, when the zoom position returns to the previous position, the calculation is made from the internal division ratio 1:3. Since the preset position is calculated, from 1:3, as the position at a camera-to-subject distance equivalent to 100, rather than 115 to 300, the difference between 115 and 100 becomes a difference from the stored camera-to-subject distance.

At least one exemplary embodiment reduces this effect by not updating the stored focus preset information. For example, when the zooming lens is driven to the wide-angle side in the manual focus mode without focus adjustment after the focus preset storage was done, if focus preset storage is performed again, at least one exemplary embodiment does not update the stored focus-preset information, thus alleviating the above-mentioned displacement problem.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2004-245204, filed Aug. 25, 2004, which is hereby incorporated by reference herein in its entirety.

What is claimed is:

1. An optical apparatus comprising:
a first moving lens group configured to be moveable along an optical axis to vary magnification;
a second moving lens group configured to be moveable along the optical axis to adjust focusing;
a position detection device configured to detect positions of the first and second moving lens groups;
a first storage device configured to store cam trajectory information related to the position of the second moving lens group relative to the position of the first moving lens group;
a control device configured to control the driving of the first and second moving lens groups; and
a second storage device;
wherein the cam trajectory information stored in the first storage device is information consisting of plural cam trajectories each corresponding to a distance from the subject;
a first switch configured to instruct the control device to store two of the plural cam trajectories and internal division ratios between the two cam trajectories in the second storage device; and
a second switch configured to instruct the control device to move the second moving lens to a focus position calculated based on a current zoom position and the two cam trajectories and the internal division ratios stored in the second storage device.

2. The apparatus according to claim 1, wherein the first and second moving lens groups are included within a rear focus lens apparatus and the second moving lens group is located on a rear focus side of the rear focus lens apparatus, behind the first moving lens group.

* * * * *